United States Patent [19]

Clements et al.

[11] Patent Number: 4,857,193

[45] Date of Patent: Aug. 15, 1989

[54] FLOATING CHICANE SYSTEM FOR LIQUID-SOLID SEPARATION EQUIPMENT

[75] Inventors: Brice P. Clements; Tatsuo Kurihara, both of Arlington; Sammy D. Marshall, Grand Prairie, all of Tex.; Rupert Syrowatka, Graz, Austria

[73] Assignee: Arus-Andritz Ruthner, Inc., Arlington, Tex.

[21] Appl. No.: 55,831

[22] Filed: Jun. 1, 1987

[51] Int. Cl.$^4$ .............................................. B01D 33/34
[52] U.S. Cl. ..................... 210/396; 210/400; 210/456; 172/646; 172/657; 172/721; 172/748
[58] Field of Search ............... 210/396, 400, 401, 456; 172/611, 646, 656, 657, 721, 748, 754, 760

[56] References Cited

U.S. PATENT DOCUMENTS

| | | | |
|---|---|---|---|
| 377,980 | 2/1888 | Bateman | 172/136 |
| 390,168 | 9/1888 | Harthan | 210/262 |
| 472,848 | 4/1892 | Bartlett et al. | 432/149 |
| 506,880 | 10/1893 | Jewell | 210/769 |
| 712,347 | 10/1902 | Wheelweight | 210/386 |
| 965,486 | 7/1910 | Putt | 100/118 |
| 966,862 | 8/1910 | Ruffin | 34/235 |
| 1,207,262 | 12/1916 | Alwart | 209/240 |
| 1,332,938 | 3/1920 | Wadsworth | 366/156 |
| 1,358,880 | 11/1920 | Rodriguez | 210/400 |
| 1,408,279 | 2/1922 | Ewald | 210/193 |
| 1,432,738 | 10/1922 | Alwart | 209/420 |
| 1,457,810 | 6/1923 | Alwart | 209/347 |
| 1,666,161 | 4/1928 | Birdsey | 198/498 |
| 1,682,460 | 8/1928 | Aldrich | 162/311 |
| 1,789,425 | 1/1931 | Cabrera | 204/276 |
| 1,875,442 | 9/1932 | Greg | 198/499 |
| 1,958,279 | 5/1934 | Morgan | 100/152 |
| 2,097,529 | 11/1937 | Nordell | 210/393 |
| 2,228,172 | 1/1941 | Luttichau | 172/611 |

(List continued on next page.)

FOREIGN PATENT DOCUMENTS

| | | |
|---|---|---|
| 21258 | 1/1936 | Australia . |
| 38879 | 5/1909 | Austria . |
| 41297 | 12/1929 | Denmark . |
| 579288 | 6/1933 | Fed. Rep. of Germany . |
| 911369 | 5/1954 | Fed. Rep. of Germany . |
| 1143790 | 2/1963 | Fed. Rep. of Germany . |
| 1575879 | 7/1969 | France . |
| 2180049 | 11/1973 | France . |
| 29-4138 | 7/1954 | Japan . |
| 64098 | 12/1922 | Sweden . |
| 79786 | 9/1931 | Sweden . |
| 88565 | 12/1937 | Sweden . |
| 499941 | 3/1976 | U.S.S.R. . |
| 521907 | 9/1976 | U.S.S.R. . |
| 856939 | 8/1981 | U.S.S.R. . |
| 491735 | 2/1938 | United Kingdom . |
| 772851 | 4/1957 | United Kingdom . |
| 1145135 | 3/1969 | United Kingdom . |
| 1598130 | 9/1981 | United Kingdom . |

OTHER PUBLICATIONS

Hedag brochure entitled "Plane Filters".

*Primary Examiner*—Peter Hruskoci
*Assistant Examiner*—Christopher Upton
*Attorney, Agent, or Firm*—Roylance, Abrams, Berdo & Goodman

[57] ABSTRACT

A chicane system is provided in a belt filter press in a gravity drainage zone. The gravity drainage zone includes a movable filter belt, an inlet section for receiving a suspension on the filter belt, and an outlet for discharging separated liquid and solid components of the suspension. A support member is mounted over the filter belt and has a longitudinal axis generally perpendicular to the filter belt movement. A plurality of flow turners depend from the support member and engage the filter belt to prevent clogging of the filter belt by the suspension solid component. Each flow turner includes a plow portion extending into the suspension and engaging the filter belt and a coupling portion fixed to the support member. The opposite ends of the support member are slidably coupled to the retaining walls for floating translatory movement of the support member and flow turners in a vertical direction toward and away from the filter belt during operation.

18 Claims, 3 Drawing Sheets

4,857,193

Page 2

U.S. PATENT DOCUMENTS

| | | | |
|---|---|---|---|
| 2,308,264 | 1/1943 | Bolton | 210/199 |
| 2,314,592 | 3/1943 | Kern | 209/428 |
| 2,389,650 | 11/1945 | Stephens | 34/67 |
| 2,395,089 | 2/1946 | Aralt | 198/633 |
| 2,848,113 | 8/1958 | Paterson et al. | 210/393 |
| 2,895,614 | 7/1959 | Komline | 210/401 |
| 2,908,339 | 10/1959 | Cook | 172/754 |
| 3,180,432 | 4/1985 | Bertelsen | 172/755 |
| 3,420,239 | 1/1969 | Lorenzen | 429/42 |
| 3,446,139 | 5/1969 | Coffelt | 100/118 |
| 3,485,377 | 12/1969 | McKenzie et al. | 210/383 |
| 3,520,410 | 7/1976 | Hutto, Jr. | 210/784 |
| 3,531,404 | 9/1970 | Goodman et al. | 210/732 |
| 3,536,146 | 10/1970 | Groenke | 172/710 |
| 3,601,039 | 8/1971 | Schouer | 100/118 |
| 3,743,100 | 7/1973 | Bahr | 210/386 |
| 3,774,760 | 11/1973 | Beristain et al. | 210/770 |
| 3,865,232 | 2/1975 | Koenig et al. | 198/497 |
| 3,873,450 | 3/1975 | Lovegreen | 210/386 |
| 3,891,549 | 6/1975 | Carmel et al. | 210/768 |
| 3,896,030 | 7/1975 | Bahr | 210/384 |
| 3,950,562 | 4/1976 | Senior | 426/431 |
| 3,984,329 | 10/1976 | Wenzel et al. | 210/396 |
| 4,078,618 | 3/1978 | Kelley | 173/12 |
| 4,079,010 | 3/1978 | Killeen et al. | 210/400 |
| 4,115,275 | 9/1978 | Morris | 210/386 |
| 4,142,971 | 3/1979 | Le Fur et al. | 210/770 |
| 4,164,597 | 8/1979 | Smith | 427/425 |
| 4,185,699 | 1/1980 | Lewison | 172/724 |
| 4,186,090 | 1/1980 | Van Oosten | 210/783 |
| 4,276,168 | 6/1981 | Bastgen | 210/396 |
| 4,305,822 | 12/1981 | Eimer et al. | 210/405 |
| 4,354,935 | 10/1982 | Austin et al. | 210/396 |
| 4,367,601 | 1/1983 | Latimer et al. | 37/57 |
| 4,459,530 | 6/1988 | Eustacchio et al. | 318/732 |
| 4,466,492 | 8/1984 | Steinberg | 172/551 |
| 4,574,502 | 3/1986 | Blau | 37/266 |
| 4,602,998 | 7/1986 | Goron | 210/400 |
| 4,609,467 | 9/1986 | Morales | 210/400 |
| 4,729,836 | 3/1988 | Ickinger et al. | 210/783 |

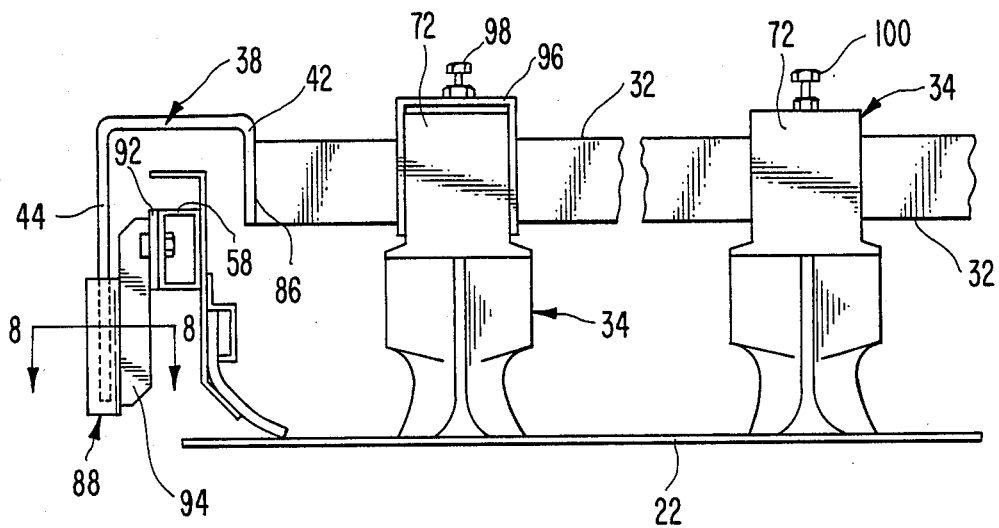
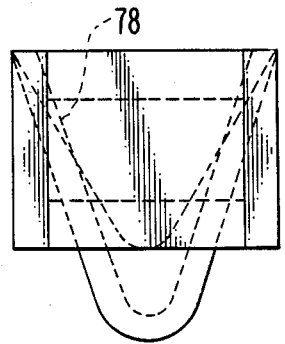
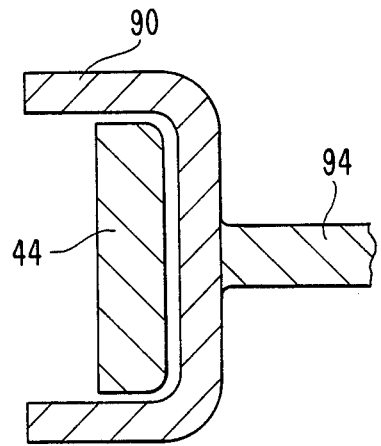

FLOATING CHICANE SYSTEM FOR LIQUID-SOLID SEPARATION EQUIPMENT

CROSS-REFERENCE TO RELATED APPLICATION

This application is related to copending U.S. patent application Ser. No. 936,306, filed Dec. 1, 1986, entitled "Flexible Chicane System for Liquid-Solid Separation Equipment", now U.S. Pat. No. 4,729,836, the disclosure of which application is incorporated herein by reference.

FIELD OF THE INVENTION

The present invention relates to a chicane system for a belt filter, belt filter press or similar liquid-solid equipment having a plurality of flow turners or plows which extend into the suspension or slurry conveyed on a filter belt and engage the filter belt. The flow turners prevent clogging of the filter belt by the solid component of the suspension and enhance drainage of free liquid through the suspension and filter belt by turning the solid components over generally helical configuration and generating filter belt areas cleared of solid components. The flow turners rest against the belt to engage positively the filter belt, and can move with and relative to the belt in response to suspension flow and belt conditions.

BACKGROUND OF THE INVENTION

In the handling of suspensions or slurries, particularly sewage sludge or other flocculated or unflocculated slurries, it is often necessary to separate the liquid from the solid component of the suspension. For effective liquid-solid separation, devices such as belt filters and belt filter presses are employed.

A suspension is deposited on one end of a belt filter in an area of an apparatus commonly referred to as the "gravity drainage zone" or "gravity section". The belt can be supported by rollers or by perforated plates. Devices enhancing drainage or flow breaker devices are employed to enhance dewatering in the gravity section. Typical arrangements on a nominal two meter sized unit involve approximately ten rows of devices with about eight or nine devices per row. This ensures that all of the sludge in the gravity drainage zone contacts the devices for achieving maximum drainage of free water.

Without devices enhancing drainage or flow breakers, the solid components of the suspension may settle on the belt such that water can not pass by gravity through the belt. The stratified liquid and solid components then exit the zone without being effectively separated. Flow deflectors or similar devices are disclosed in U.S. Pat. No. 4,456,530 to Eustacchio et al. U.S. Pat. No. 3,984,329 to Wenzel et al, U.S. Pat. No. 4,602,998 to Goron and U.S. Pat. No. 4,609,467 to Morales.

By use of suitable flow breakers, the slurry blanket is split and the solid component is pushed aside exposing filter media cleared of slurry or solid material. Openings generated by such flow breakers within the solid component expose the belt to the free water and enable the free water to pass through the belt for collection below the filter belt. The solid component is then separately collected and discharged at an end of the filter belt opposite its inlet for downstream dewatering operations.

The systems disclosed in some of the above cited patents employ upright elongated members of cylindrical or wedge shape as flow breakers for breaking or splitting the slurry. The conventional flow breakers are pivoted or lifted in directions away from the filter belt by relatively complex mechanisms which are relatively difficult and expensive to manufacture and maintain. Additionally, conventional flow breakers interrupt or deflect the slurry, rather than gently turning the slurry upside down.

SUMMARY OF THE INVENTION

It has now been discovered that disadvantages associated with conventional chicane systems for belt filters and belt filter presses can be eliminated by flow turners that fixedly depend from a support member, which support member is coupled to the press structure for floating translatory movement (i.e., uniform movement of a body without rotation). Each flow turner includes a plow portion adapted to extend into the suspension and against the filter belt, preventing clogging of the filter belt by the solid component of the suspension.

In this manner, the support member and the flow turners depending from the support member can move in a vertical direction toward and away from the filter belt during operation. This will permit the plow portions to maintain adequate pressure on the belt, while permitting movement having a vertical component to avoid undue stresses on damage to the filter belt.

Since a simple sliding coupling is provided between the ends of the support member and the press structure, the device is simple and inexpensive to manufacture and maintain. The sliding parts can be located laterally outside of the press retaining walls and spaced from the suspension to avoid being damaged by the suspension. Moreover, this arrangement facilitates installation and removal of the chicane system from the retaining walls by merely moving or sliding them into position.

The flow turner design is insensitive to the buildup of fibers, solids, and other forms of debris commonly found in sludge. Moreover, the flow turner can follow the contour of the belt to avoid damage resulting from materials stuck to the belt or seams in the belt.

Preferably, the support member ends are attached to the press retaining walls or press frame by U-shaped brackets having one leg of each bracket affixed to an end of the support member. The opposite leg of each U-shaped bracket is received within a guide member sleeve or channel adjustably attached to the outside of the retaining wall. The guide member formed by the sleeve or channel can control movement of the support member and flow turners at an acute angle relative to the filter belt or at a perpendicular angle to the filter belt.

Each flow turner can be formed of a unitary, one-piece structure. The upper portion of the flow turner has a through passage which can be rectangular in transverse cross-sectional shape. The support member can also be formed with a similar cross-sectional shape to provide a frictional engagement between the support member and the flow turner. By unitarily molding the flow turner out of synthetic plastic such as rubber and specialty plastic, most preferably polyurethane or polyethylene, the molding process can be combined with proper material to permit the flow turners to be easily and inexpensively manufactured. Since there are no relatively moving parts over the suspension flow, the flow turners are more reliable and noncorroding. Additionally, this material for the flow turners easily slides along the belt, facilitating movement of the belt and avoiding damage to the belt.

The plow portions preferably have the general configuration of cultivator plows, having a front surface tapering in a direction in opposition to the suspension flow and having a recessed rear surface. The tapered front assists in deflecting the flow of the suspension, while minimizing turbulence. The recessed rear surface of the plow portion provides a quiescent zone within the periphery of the plow portion and immediately therebehind where water can collect over a portion of the filter belt which is free of solid components and then drain through the belt. The bottom part of the plow is flared outwardly to make it self-sharpening, enhancing belt cleaning and drainage. The flared bottom also increases the contact area of the flow turner on the belt, reducing wear on the filter belt. The unique shape permits the use of significantly fewer devices than conventional systems, by having a wider effect on the slurry across the filter belt.

The plow portion can be shaped on its lateral sides to enhance turning of the suspension or solids component of the suspension. Plow shares extending laterally from the plow body provide a lifting action further enhancing the turning of the material. The bottom part of the slurry moves upwardly, while the top layer containing a greater amount of free draining liquid is moved downwardly, such that the flow is not merely separated as with conventional upright, elongated members of generally cylindrical or wedge shape. Instead, the slurry follows a generally helical path as it passes over the plow portion surface. In this manner, the position of the less dense slurry is exchanged with that of the more dense slurry.

Other advantages and salient features of the present features of the present invention will become apparent from the following detailed description, which, taken in conjunction with the annexed drawings, discloses preferred embodiments of the present invention.

BRIEF DESCRIPTION OF THE DRAWINGS

FIGS. 4, 5, and 6 are side elevational, front elevational, and top plan views, respectively, of the flow turner of the chicane system of FIG. 1.

FIG. 7 is a partial, front elevational view of a chicane system according to a second embodiment of the present invention.

FIG. 8 is a partial, top plan view of the chicane system of FIG. 7 in section taken along line 8—8 of FIG. 7.

DETAILED DESCRIPTION OF THE DRAWINGS

Figure 1:
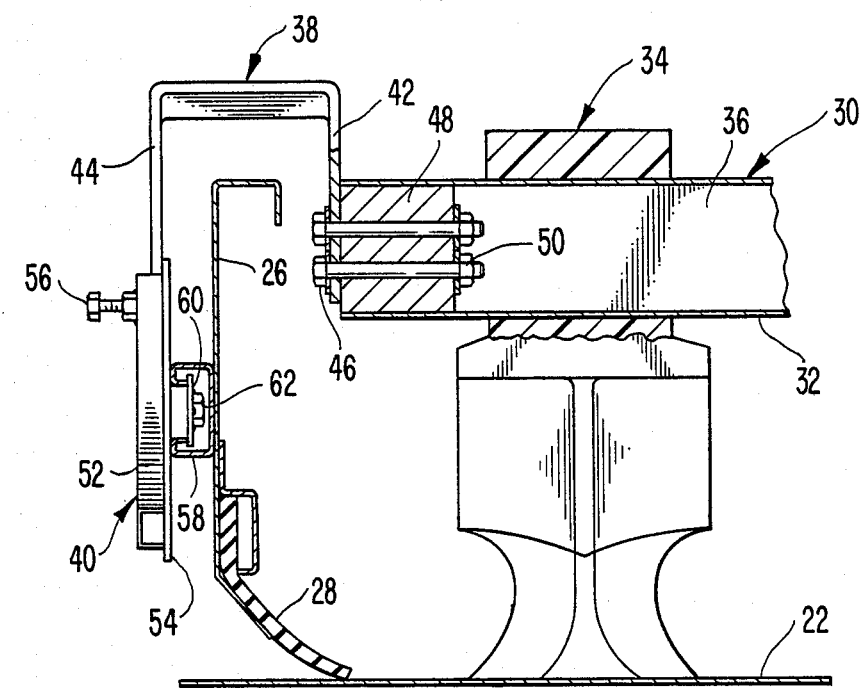
FIG. 1 is a partial, front elevational view, in partial section, of a chicane system for a filter press according to a first embodiment of the present invention.
Figure 2:
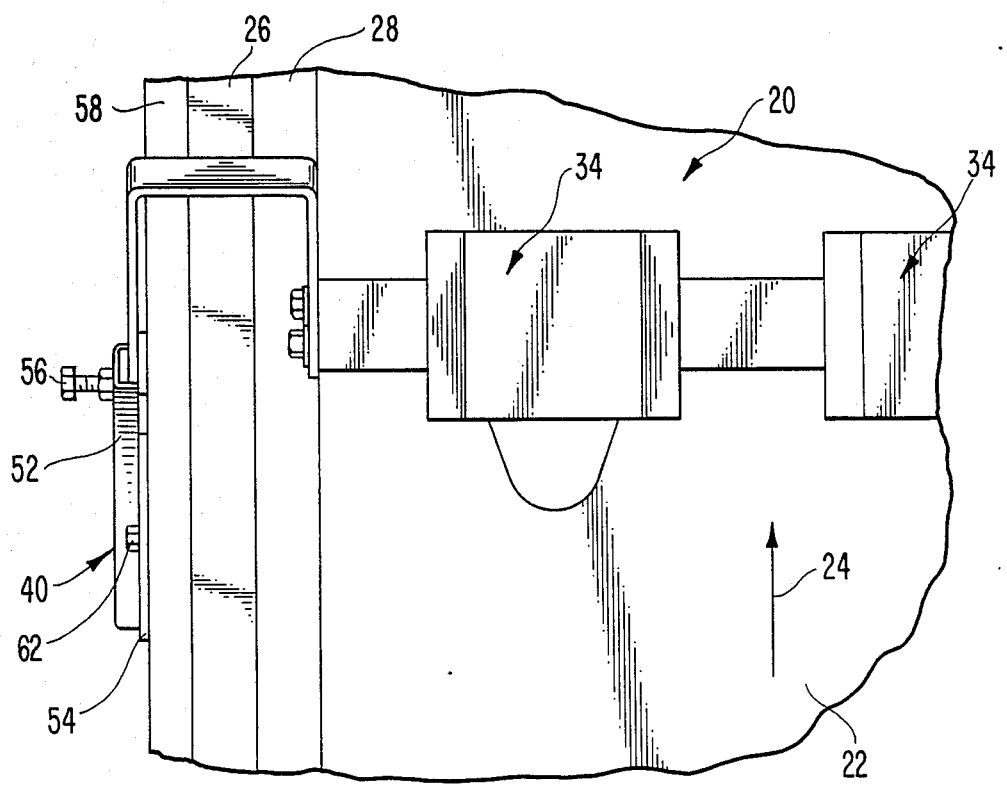
FIG. 2 is a partial, top plan view of the chicane system of FIG. 1.
Figure 3:
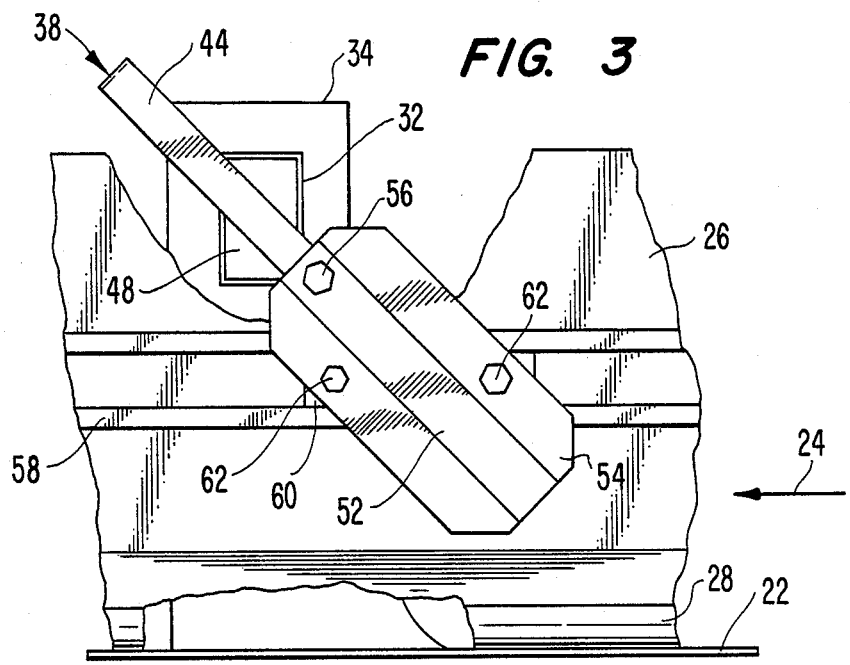
FIG. 3 is a partial, side elevational view, with portions broken away, of the chicane system of FIG. 1.

Referring initially to FIGS. 1-3, the present invention relates to a chicane system of a belt filter or belt filter press having a gravity drainage zone 20 for separating the liquid component from the solid component of a suspension or slurry, e.g., sewage sludge. Gravity drainage zone 20 comprises a movable filter belt 22, moved by a suitable and conventional drive mechanism in a direction indicated by arrow 24. The gravity drainage zone can also include a rigid support including side supports and a base plate (not shown). The base plate has a plurality of holes through which a liquid may pass into a suitable trough (not shown). The trough conveys the liquid to a suitable discharge point.

Each side of the filter press is the mirror image of the other. Thus, only one side is illustrated and will be described in detail.

Lateral retaining walls 26 are spaced inwardly from the side supports and are located over lateral sides of filter belt 22. A seal 28 depends from each retaining wall and engages the upper surface of the filter belt, such that the slurry is laterally retained on the filter belt by the retaining walls 26 and seals 28. Adjacent to the inlet end of the filter belt, a distributor is located over the belt for evenly distributing a suspension on the filter belt at the inlet end of gravity drainage zone 20.

Chicane system 30 comprises a support member 32 and a plurality of flow turners 34. Flow turners 34 depend from the support member and are spaced along the longitudinal axis of the support member. Additionally, the flow turners engage the filter belt to prevent clogging of the filter belt by the solid component of the suspension. Support member 32 is rectangular in transverse cross section, and can be hollow defining a hollow interior 36. The hollow interior can be left empty, or can be filled with steel bars, sand or other materials to increase the chicane system weight, and therefore, the force on the belt. The support member can also be solid. The central axis of the support member extends perpendicular to the flow direction of the suspension and the movement of the filter belt indicated by arrow 24.

Support member 32 is coupled to retaining walls 26 for free-floating translatory movement of the support member and flow turners in a vertical direction toward and away from filter belt 22 during operation. The chicane system moves when an upward force is extended on it greater than the downward force generated by its weight. The coupling between each support member end and each retaining wall comprises a bracket 38 and a guide member 40. Bracket 38 is U-shaped with two generally downwardly extending legs 42 and 44. The legs are connected at their uppermost ends. Leg 42 is fixed to one end of support member 32 by suitable means. In the first embodiment of FIGS. 1-3, leg 42 is secured to the support member end by bolts 46. Bolts 46 extend through openings adjacent to the free end of leg 42 and pass into bores in support block 48. Support block 48 is slidably mounted within hollow interior 36 of support member 32 to permit lateral movement of the support member and to allow easy removal and mounting of flow turners 34 by removal of bracket 38 while attached to support block 48. This sliding coupling of the support member and support block permits the system to be readily adapted to the press width by removing the support block and cutting the support member to size. The support block could also be mounted to telescope over the support member end. Nuts 50 are threaded on the ends of bolts 46 remote from leg 42 to complete the attachment.

As illustrated particularly in FIG. 1, bracket 38 extends over the top of retaining wall 26 such that leg 44 extends downwardly into guide member 40 located on the outside of retaining wall 26. In this manner, leg 44 and guide member 40 are separated from the sludge flow by the retaining wall. If the flow breakers are higher, the bracket can be L-shaped.

Guide member 40 comprises a rectangular tubular sleeve 52 attached to a mounting plate 54. Leg 44 of bracket 38 is slidably received within the interior of sleeve 52. Sleeve 52 and leg 44 could be cylindrical rather than rectangular. A set screw 56 can pass through the wall of sleeve 52 such that it can frictionally engage leg 44. The set screw can engage the leg to lock the leg in a selected position within the sleeve (e.g., to hold the flow turners above the sludge flow for cleaning), or can be spaced from leg 44 to permit free-sliding movement of the leg within the sleeve. Other suitable locking devices can be employed in lieu of set screw 56.

Bracket legs 42 and 44 and sleeve 52 extend at an acute angle relative to filter belt 22 of between 0° and 90° depending on slurry characteristics. The angle is preferably between about 15° and about 90°, and is most preferably between about 30° and 45°. In this manner, the sliding support for the support member controls the movement of the support member and flow turners such that they only move translationally (i.e., without rotation or uniformly) along a path extending upwardly and downstream relative to the filter belt and its movement.

Guide member 40 is adjustably mounted on retaining wall 26 such that the guide member, and thereby the support member and flow turners, can be selectably positioned along the length of gravity section 20. The adjustable mounting for guide member 40 includes a C-shaped channel 58. The back of the channel is suitably fixed to the outside surface of retaining wall 26, e.g., by bolts or welding, such that the channel opens laterally outwardly. A support plate 60 is slidably received within channel 58 and abuts the inwardly turned edges of the channel. Fasteners 62, including nuts and bolts, extend through aligned openings in mounting plate 54 and support plate 60. Support plate 60 can be replaced by a lock spring or lock nut.

When the nuts and bolts are loose, guide member 40 can slide along the length of channel 54. When the bolts are tightened, guide member 40 will be locked in position relative to the channel in a desired position along the length of retaining wall 26 and gravity section 20. Guide member 40 is only moved for adjustment of the positioning of the support member and of the flow breakers along the longitudinal axis of the belt filter. During operation, the guide member is stationary and fixed in a desired position on the retaining wall.

Figure 4:
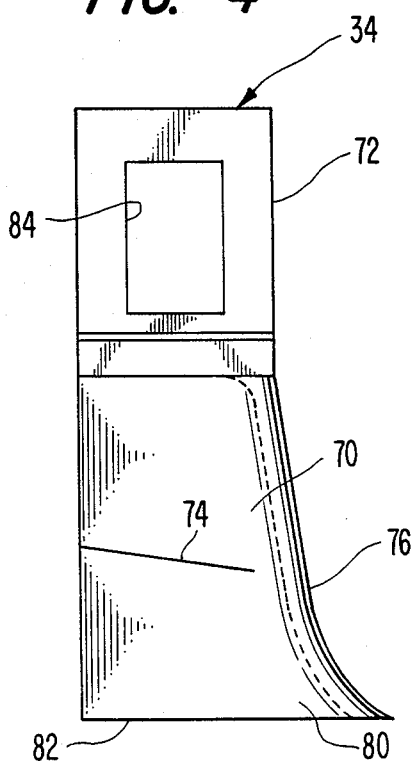
Figure 5:
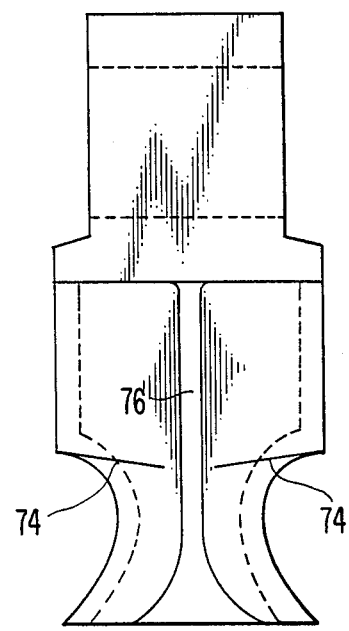

The details of each flow turner are more clearly illustrated in FIGS. 4-6. As illustrated therein, each flow turner is formed as a unitary, one-piece structure with a plow portion 70 forming the lower portion of the flow turner and a coupling portion 72 forming the upper portion of the flow turner. The flow turner is unitarily molded of flexible, elastic, abrasion-resistant synthetic plastic. This plastic is preferably polyurethane or polyethylene.

Plow portion 70 is essentially in the shape of a cultivator plow tapering in a direction opposite to the suspension flow and having laterally extending plow shares 74. The forward part 76 is rounded and curved to avoid a buildup of fibers and to generate an upward flow of the sludge. The central portion of the plow is hollow and is open in a rearward or downstream direction to provide a recessed rear surface 78. The bottom portion 80 flares outwardly and terminates in a flat bottom surface 82 for riding on the filter belt such that the edges of surface 82 are self-sharpening. Bottom surface 82 is generally V-shaped or U-shaped. The cross-sectional configuration of the plow portion parallel to the filter belt is generally V-shaped, but varies in a vertical direction perpendicular to the filter belt. Other plow portion shapes can be employed, e.g., one without plow shares 74.

Coupling portion 72 comprises a passage 84 extending through coupling portion 72. Passage 84 is substantially rectangular in transverse cross section, and extends through coupling portion 72 along an axis which can be perpendicular to suspension flow direction 24 when the flow turner is properly positioned in the gravity drainage zone. The transverse dimensions of the support member and of the flow turner passage 84 provide a tight fit between the support member and the flow turner such that they frictionally engage each other preventing lateral movement of the flow turner relative to the support member during operation. Additionally, passage 84 locates a flow turner such that the flow turner center of gravity is adjacent to or on the central axis of support member 32.

In operation, the assembly of the support member 32, flow turners 34 and brackets 38 is formed. Guide members 40 are located in the desired positions along the length of the retaining walls. The support member, flow turner, and bracket assembly is then lowered into position with legs 44 entering the passages defined by the internal surfaces of sleeves 52 until bottom surfaces 82 of the flow turners engage filter belt 22. The weight of this assembly will bias the flow turners against the belt. The sliding coupling provided by brackets 38 and guide members 40 will permit the flow turners to move in an upward and downstream direction translationally only upon encountering an obstruction. Once the obstruction has passed, the weight bias will cause the assembly to return to its original operating position with the flow turners in direct surface-to-surface contact with filter belt 22. In this manner, the sliding coupling permits floating translatory movement of support member 32 and flow turners 34 in a vertical direction toward and away from filter belt 22 during operation and is operable for response to obstructive conditions on the filter belt and in the suspension.

FIGS. 7 and 8 illustrate a modified form of the present invention and constitute a second embodiment. Features of the second embodiment which are similar to those of the first embodiment are identified with like reference numbers.

In the second embodiment, U-shaped bracket 38 has its leg 42 secured to one end of support member 32 by welds 86. Leg 44 is slidably received within guide member 88 such that support member 32 and flow turners 34 can only move in a vertical direction, essentially perpendicular to filter belt 22. Guide member 88 constitutes a laterally open channel attached to mounting plate 92 by extension 94. Mounting plate 94 is secured to channel 58 in a manner similar to that described above for the connection between mounting plate 54 and channel 58 of the first embodiment.

The embodiment of FIGS. 7 and 8 also describes alternative attachments of the flow turners to the support member. In addition to the frictional engagement between the flow turners and the support member, an attachment bracket 96 with a locking screw 98 can be provided. The legs of the U-shaped bracket 96 have openings through which the support member passes. The locking screw 98 lifts the bracket relative to the support member causing tight frictional engagement between the bracket and the support member to prevent movement of coupling portion 72 of the flow turner trapped between the two legs of U-shaped bracket 96.

The other flow turner in the embodiment of FIG. 7, illustrated on the right-hand side, has a set screw threadedly engaged with an internally threaded bore in coupling portion 72. Set screw 100 has an inner end which will frictionally engage support member 32 to further lock the flow turner in position on the support member.

In all other respects, the second embodiment operates essentially in the same manner as the first embodiment. The main operational difference is that the second embodiment of FIGS. 7 and 8 moves only in a direction which is perpendicular to filter belt 22.

Instead of locating guide members 40 on the retaining walls 26, such guide members can be also located on the support sides of the belt filter press or similar liquid-solid separation equipment. It is important that the guide members be located laterally outside of the retaining walls, and thereby remote from the suspension flow.

Locating the guide members on the outside of the retaining walls positions the guide member close to the filter belt minimizing the force of leg 44 against the interior of sleeve 52. The closer the guide member is located to the filter belt, the lower the torque tending to rotate the chicane assembly in the belt travel direction. Additionally, this support arrangement will cause the flow turners to rest flat on the filter belt and not be forced in the belt travel direction, provide a smaller moment at the guide member facilitating upward and downward movement of the chicane assembly, and permit relatively small dimensions for the guide member and bracket.

Although the invention has been described in considerable detail, with particular reference to certain preferred embodiments thereof, variations and modifications can be effected within the scope and spirit of the invention as defined in the appended claims.

What is claimed is:

1. A chicane system for a belt filter, comprising:
   a gravity drainage zone having a movable filter conveyor belt, inlet means for receiving a suspension on said filter belt, outlet means for discharging separated liquid and solid components of the suspension, and lateral retaining walls;
   a support member mounted over said filter belt and having a longitudinal axis generally perpendicular to filter belt movement;
   a plurality of flow turners depending from said support member and engaging said filter belt to prevent clogging of said filter belt by solid components of the suspension, each of said flow turners including a plow portion to extend into the suspension engaging and resting on said filter belt and a coupling portion fixed to said support member; and
   sliding support means mounting said support member over said filter belt for floating translatory movement of said support member and flow turners in a vertical direction toward and away from said filter belt during operation and operatable for response to obstructive conditions on said filter belt and in the suspension.

2. A chicane system according to claim 1 wherein said sliding support means comprises sliding members extending from opposite ends of said support member and stationary guide members fixed to said retaining walls, said guide members receiving and controlling movement of said sliding members along parallel rectilinear paths.

3. A chicane system according to claim 2 wherein said sliding members comprise bars; and said guide members define passages receiving said bars for free sliding movement.

4. A chicane system according to claim 3 wherein said guide members comprise sleeves.

5. A chicane system according to claim 3 wherein said guide members comprise laterally open channels.

6. A chicane system according to claim 2 wherein each said sliding member comprises a U-shaped bracket with a first leg attached to one end of said support member and a second leg received in one said guide members.

7. A chicane system according to claim 2 wherein adjustable coupling means comprises means for mounting said guide members in selected positions along a length of said retaining walls.

8. A chicane system according to claim 7 wherein said adjustable coupling means comprises open channels on said retaining walls and fastener means coupled to said channels and said guide members.

9. A chicane system according to claim 2 wherein said guide members comprise means for selectively locking said support member in position relative to said filter belt.

10. A chicane system according to claim 1 wherein said sliding support means comprises means for controlling movement of said support member and said flow turners along a path at an acute angle to said filter belt.

11. A chicane system according to claim 10 wherein said path extends upwardly and downstream relative to said filter belt.

12. A chicane system according to claim 1 wherein said sliding support system comprises means for controlling movement of said support member and said flow turners along a path substantially perpendicular to said filter belt.

13. A chicane system according to claim 1 wherein said support member is hollow.

14. A chicane system according to claim 1 wherein said support member is rectangular in transverse cross-sectional shape.

15. A chicane system according to claim 14 wherein each said coupling portion comprises a rectangular passage, corresponding in size to said support member, through which said support member extends.

16. A chicane system according to claim 15 wherein said flow turners comprise means for frictionally engaging said support member.

17. A chicane system according to claim 1 wherein each said plow portion comprises suspension turning means for causing the suspension to flow along a generally helical path upon contacting each said plow portion.

18. A chicane system according to claim 17 wherein said suspension turning means comprise at least one plow share extending laterally from each said plow portion.

* * * * *